March 15, 1960

J. F. BRYAN ET AL 2,929,019

MAGNETIC FIELD DETECTION

Filed Dec. 14, 1955

INVENTORS
JOSEPH F. BRYAN
JAMES R. PATMORE
BY
Pennie, Edmonds, Morton, Barrows & Taylor
ATTORNEYS United States Patent Office 2,929,019
Patented Mar. 15, 1960

2,929,019

MAGNETIC FIELD DETECTION

Joseph F. Bryan, Oceanport, and James R. Patmore, Neptune, N.J., assignors to Electronic Associates, Inc., Long Branch, N.J., a corporation of New Jersey Application December 14, 1955, Serial No. 553,102

14 Claims. (Cl. 324—43)

This invention relates to detection of magnetic fields and particularly to detectors adapted to sense the locus of an extended alternating-current electromagnetic field.

More specifically, the invention comprises means for producing a uni-directional voltage of which the amplitude and polarity are functions of the magnitude and phase with respect to the magnitude and phase of a reference voltage, at successive points along an extended alternating-current electromagnetic field.

Although the system of our invention is useful in a variety of applications it is especially useful in the field of graphic analysis where it is frequently desirable to trace or make duplicates of one or more variables represented graphically on a plane or curved surface. Conventionally, the duplication of such a function, to the same or a different scale, requires that the function be plotted by manual or semi-manual methods or by photographic or comparable methods. Our invention may be employed in conjunction with electromechanical tracing apparatus such as servo-driven tracing pens by which a function of one or more variables once plotted may be automatically and quickly traced or duplicated any number of times.

Another application of the invention makes it possible to feed to an actuating apparatus, for example an analog computer, automatically and continuously the values of a dependent variable over any range of an independent variable for which the function is continuous.

Briefly, the system of our invention comprises a source of alternating current preferably of radio frequency, and a pickup which automatically follows an electromagnetic field along an extended current-carrying path which is established by an alternating current derived from the mentioned source which is caused to flow through the path.

Apparatus intended to be capable of following an extended electromagnetic path has heretofore been proposed, but such apparatus has been suitable only for following the fields produced by large cables and the like, and has been cumbersome and complicated. On the other hand, the apparatus of the present invention, although capable of detecting large magnetic fields, is especially adapted to detect the extremely small and comparatively weak field established around a narrow electric conductor or conducting line which may, for example, be only a small fraction of an inch in diameter or width. Our apparatus is not only amply sensitive to detect phase and magnitude variations in following such a magnetic field but it is extremely simple, inexpensive and more accurate and reliable than any equipment heretofore available.

The nature of the apparatus according to our invention and its method of use will be understood from the following description considered in connection with the accompanying drawing, in which.

Figure 1:
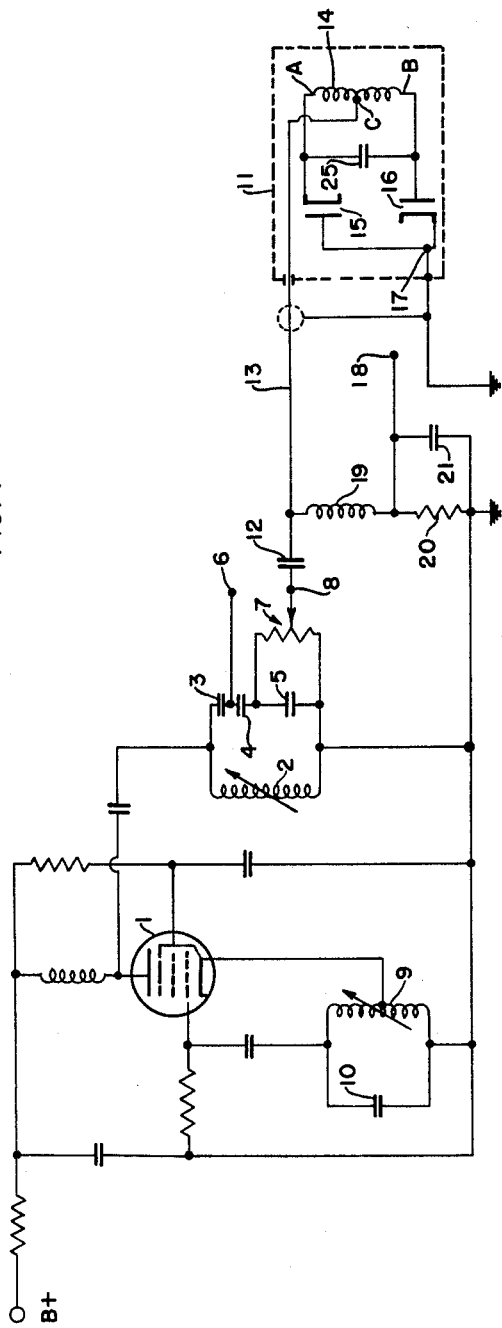
Fig. 1 is a circuit diagram of apparatus according to the invention.

The invention, as illustrated in Fig. 1, comprises fundamentally a source of alternating current such as a radio-frequency oscillator and a detector or pickup unit to which it is coupled. The output of the pickup unit comprises a fluctuating, pulsed, uni-directional or D.C. output voltage which is suitable to apply to a servo-system which in turn causes the detector unit to follow with considerable accuracy the locus or curve of an extended magnetic field established around a current-conducting path. In the assumed case this path, as above stated, comprises a curve or plot representing a given function comprising two quantities, one of which for simplicity of explanation may be considered as a fixed quantity. By employing the output of the oscillator to produce the magnetic field and also to provide a reference voltage the required apparatus is considerably simplified.

In the example illustrated in Fig. 1, the oscillator tube 1, for which a type 6AQ5 pentode is suitable, is connected in a Hartley oscillator circuit of fundamentally conventional form. Any other suitable type of oscillator could be substituted. The anode or output circuit of this oscillator includes a tuned circuit comprising variable inductance 2 and condensers 3, 4 and 5 which are connected in series across the inductance. This circuit is tuned to the oscillation frequency which, in this instance, is assumed to be 450 kc. In general the frequency is dictated by the dimensions of the elements in the pickup head. These three condensers in series serve as a voltage divider to provide the two output voltages furnished by the oscillator. The radio-frequency output available at terminal 6 is connected to one end of conducting path 22, Fig. 2, of which the other end is grounded and thus is connected to the common return circuit. This output connection between condensers 3 and 4 provides a voltage somewhat less than the total output voltage of the oscillator, which can be assumed to be of sinusoidal form. A potentiometer 7 is connected across condenser 5 and provides at terminal 8 a reference voltage which is variable by adjustment of the potentiometer. The grid circuit of the oscillator is tunable by inductance 9 across which a condenser 10 is connected. Adjustment of inductance 9 changes the frequency of the oscillator and thus the frequency can be adjusted to mtach the resonant frequency of the pickup head. Condenser 25 shunting inductance 14 tunes the pickup coil to the required frequency. If the distributed capacity of the inductance is sufficient, condenser 25 may be omitted.

The pickup head 11 is coupled to the reference voltage terminal 8 through coupling condenser 12 by way of RF connecting lead 13 which should be of the shielded or co-axial type. This shielded conductor passes through the casing of the pickup head and is preferably connected directly to the midpoint tap C on the pickup coil 14. The end terminals A and B of coil 14 are connected, respectively, to similar rectifiers 15 and 16. These rectifiers are preferably of the very small silicon junction diode type, and are connected in a series circuit across the terminals A, B of the coil 14 so as to be conducting in the same direction. The remaining rectifier terminals are connected together at common junction 17 which is connected to the grounded return, as shown. In the appended claims the described connection of the diodes is referred to by the term "series aiding." The rectified or uni-directional output of rectifiers 15, 16 is available at terminal 18. It will be noted that the direct-current path from the rectifier circuit extends from midtap C on coil 14 through the RF conductor 13 and RF choke 19 to terminal 18. Resistor 20 shunted by condenser 21, which together are connected between the bottom of choke 19 and ground, comprise the input coupling impedances to the pickup head. Elements 20, 21 also serve as an A.C. filter for the D.C. output.

The circuit elements and their connections which constitute the pickup head comprise an important feature of the present invention. In connection with tracing narrow curves the entire head 11 should be extremely small and light in weight. The circuit elements contained therein are preferably molded in a solid block of plastic material of which the dimensions were approximately 1¼" long, ¾" high and ⅜" wide. In view of the smallness of diodes 15 and 16, coil 14 is the largest element involved. It is comprised of two fine wires wound bi-filar around a cylindrical core. In the given example the coil had an inductance of approximately 0.4 millihenry. The core form may be of magnetic or non-magnetic material. For many purposes, such as in the mentioned example involving a narrow curve, a core of molded ferro-magnetic material is desirable. Such a core may be of approximately ⅛" in diameter and between ½" and ⅝" in length. The lower end of the core is flush with the exterior surface of the casing. As shown in the figure, the lower end of one strand is connected directly to the upper end of the other strand, and a tap is taken from this connection to form a midpoint tap C. The remaining ends, A and B, of the inductance 14 are connected, respectively, to the cathode and anode of rectifiers 15 and 16. The anode and cathode, respectively, of rectifiers 15 and 16 are connected together by lead 17, which, through ground, closes the return circuit to the oscillator. It is an advantage to locate the rectifier close to the pickup coil so that the A.C. signal induced in the pickup coil will be converted to D.C. within the head. This construction has proved to be of great value because it confines the A.C. radio-frequency signal to the head itself, permitting the other apparatus to be located at a convenient distance without introducing errors and circuit complications such as stray couplings and additional amplifiers, for instance.

The theory of operation is comparatively simple. In the presence of a magnetic field generated by alternating current flowing through a line to be traced, a voltage is induced in coil 14 of phase depending upon the direction in which the lines of force pass through the coil. Assuming that the coil has been moved off the center of the line in one direction a voltage of particular phase is induced such that it adds to the reference voltage across CA and subtracts from the reference voltage across CB. This induced voltage comprises two half-sine wave pulses for each sine wave of the reference voltage. Unequal currents are thus caused to flow in the two diodes producing, for example, a greater conduction in diode 15 and a resultant direct current, or a unidirectional pulsating current, in a given direction through conductor 13. In other words, assuming that $e_1$ is the RF output voltage at terminal 8, and $e_2$ is the voltage induced across coil 14 by the detected magnetic field, the voltage output from one rectifier is $e_1 - \frac{1}{2}e_2$ and that from the other rectifier is $e_1 + \frac{1}{2}e_2$. It will be evident that this relation maintains only when the core, if employed, is operated below saturation. It will thus be seen that, essentially, the operation of this system is based on the reaction of two magnetic fields. The field produced by the "line" is sinusoidal, and that produced by the pickup head is of unidirectional half-sine pulses at twice the frequency of the reference current. Since the D.C. portion of the current must flow through inductance 19 and resistance 20 a D.C. voltage drop appears across these two components. Since the D.C. resistance of coil 19 is much lower than that of resistor 20, the major portion of this voltage drop appears across resistor 20 and is available at terminal 18, with respect to ground, for use in the mentioned servosystem or for other purpose. Inductance 19 and condenser 21 constitute the principal filtering elements in the circuit, preventing radio-frequency voltage from appearing at terminal 18, and smoothing the direct current signal voltage which appears there.

Moving the pickup head toward the other side of the line induces a current of opposite phase in pickup coil 14 because the lines of force through this coil will be in the opposite direction from those assumed in the first case. This, in turn, tends to subtract from the reference voltage across CA and adds to the reference voltage across CB, producing a greater conduction in diode 16 and a direct current through conductor 13 in the opposite direction from that of the first case, and, as before, of magnitude substantially proportional to the degree of deviation from the center of the line.

Figure 2:
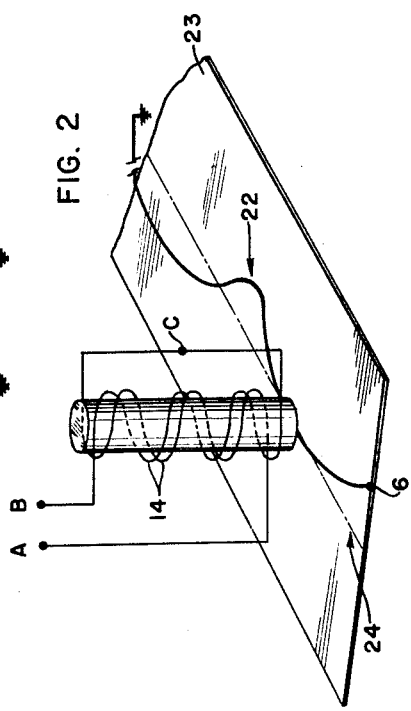
Fig. 2 is an isometric view in elementary form of a preferred embodiment of a pickup coil in its relation to an arbitrary conducting path.

The pickup head is considerably smaller and of lighter weight than comparable pickups heretofore used for following magnetic paths. As a result, the apparatus of the present invention is capable of following a comparatively fine or narrow conducting line with considerable accuracy. The pickup inductance should be accurately symmetrical so that a given deviation either side of the line will produce the same correcting effect through the servo-mechanism. Accordingly, the two coil branches A—C and B—C should produce equal inductive effects when equally influenced by a given symmetrical field. If the inductance is wound as a coil of many turns, the two branches can be wound on opposite outer legs of an E-shaped magnetic core; or, as illustrated in Fig. 2, the turns are preferably wound on a simple cylindrical magnetic core. If the core is of small diameter, such as of the order of ⅛ inch, the pickup head will follow a conducting path of ⅛ inch width or less if the movable portion of the mechanism is adequately damped. Although path 22 may comprise any suitable conductor, it may be traced or drawn in a conductive ink, or made with a conductive tape, or otherwise, on a surface of insulating material such as tracing cloth, for example. Tracing ink may be made conductive by the addition of colloidal metal, such as silver.

The servo-mechanism, curve-duplicating pens or computer, which, as mentioned, can be connected to the D.C. output 18 are not here shown or described because they can be of various known forms depending upon the specific requirements. Servo-mechanisms are available which will respond to variations in polarity and magnitude resulting from the deviation of the pickup head as it follows the curve 22 on the insulating sheet 23. To accomplish this in connection with a curve such as that illustrated, a duplicating pen at a remote point, for example, is driven at a constant rate along a base line corresponding to line 24 while the pen is moved at right angles thereto either above or below the base line in resopnse to the polarity and magnitude of the D.C. output appearing at terminal 18 of Fig. 1. Obviously, if the curve is long, the sheet on which the curve is to be drawn would preferably comprise a ribbon or tape which would be moved at a constant rate under the pen, and the pen would be driven by the servo-mechanism along a straight line which would be perpendicular to the mentioned base line.

We claim:

1. Apparatus sensitive to relative lateral displacement of follower means with respect to an electromagnetic field established by a current-conducting path, which comprises: a source of radio-frequency alternating current; alternating-current connecting means from the output of said source to the conductive path; follower means remote from said source and movable relative to the conductive path, said follower means including a bi-filar wound inductance coil comprising two windings, a pair of silicon junction diodes connected between opposite ends of each of said windings in a series aiding circuit, said circuit including a common junction between said diodes, and capacitive means associated with said coil for resonating the latter at the frequency of said source; a connection between the remaining ends of said windings; a terminal on said connection; a capacitive coupling from said source to said terminal to provide reference current in said coil; a return connection from the common junction of said diodes to said source; and a connection including a radio-frequency choke from said terminal to provide a uni-directional signal to signal utilization means, whereby currents induced in the two windings of said coil by said electromagnetic field respectively aid and oppose the reference current in said windings, and the aided and opposed currents are rectified to produce a net uni-directional signal of instantaneous polarity and magnitude representative of direction and magnitude, respectively, of lateral displacement of said inductance coil with respect to said path.

2. Apparatus sensitive to relative lateral displacement of follower means with respect to an electromagnetic field established by an extended current-conducting path, which comprises: a source of radio-frequency alternating current; alternating-current connecting means for coupling said source to said path; follower means disposed remote from said source and movable with respect to the path, said follower means comprising as a unitary structure a pickup coil having two substantially identical symmetrical inductive windings, one end of each winding being connected to a common input and output terminal for said follower means, and a pair of rectifiers connected series aiding between the other ends of said windings and having a common junction; a return path from said junction to said source; an alternating-current connection coupling the output of said source to said common terminal to provide a reference current to said coil; and a direct-current connection from said common terminal adapted to provide a uni-directional signal to signal-responsive means, whereby currents induced in said windings by said field respectively aid and oppose the reference current in said windings, and the aided and opposed currents are rectified to produce a net uni-directional signal having instantaneous polarity representative of the direction of lateral displacement of said pickup coil with respect to said path.

3. A detector circuit responsive to relative lateral displacement of a sensing unit with respect to an electromagnetic field established by a current-conducting path, which circuit comprises a symmetrical center-tapped inductance adapted to be positioned adjacent said path symmetrically or asymmetrically with respect to the center of said path, a source of radio-frequency alternating current, means for coupling said source to said path whereby a radio-frequency current flows through said path, means for coupling said source to the center tap of said inductance, a pair of rectifying means connected in series aiding across the terminals of said inductance, the remaining terminals of said rectifying means being connected in common to said source, and a direct-current connection from said center tap adapted to be connected to a signal utilization means, whereby unbalanced voltages induced by said electromagnetic field in the respective branches of said inductance between said center tap and said terminals are algebraically added to the reference voltage developed in each branch from said source and are rectified by said rectifying means to produce a voltage difference signal of polarity and magnitude indicative of the direction and magnitude of the lateral displacement of the sensing unit with respect to said path.

4. A detector circuit responsive to relative lateral displacement of a sensing unit with respect to an electromagnetic field established by a current-conducting path, which circuit comprises a symmetrical center-tapped inductance adapted to be positioned adjacent said path symmetrically or asymmetrically with respect to the center of said path, a source of radio-frequency alternating current including an output circuit, first, second and third voltage-dividing condensers connected in series in said output circuit, means connected between said first and second condensers for coupling said source to said path whereby a radio-frequency current flows through said path, voltage-adjusting means connected between said second and third condensers for coupling said source to the center tap of said inductance, said condensers being proportioned such that the alternating voltage conductively impressed on said path is higher than that impressed on said inductance, a pair of rectifying means connected in series aiding across the terminals of said inductance, the remaining terminals of said rectifying means being connected in common to said source, and a direct-current connection from said center tap adapted to be connected to a signal utilization means, whereby unbalanced voltages induced by said electromagnetic field in the respective branches of said inductance between said center tap and said terminals are algebraically added to the reference voltage developed in each branch from said source and are rectified by said rectifying means to produce a voltage difference signal of polarity and magnitude indicative of the direction and magnitude of the lateral displacement of the sensing unit with respect to the center of said path.

5. Magnetic field detection apparatus comprising a center-tapped balanced inductive winding adapted to be symmetrically or asymmetrically coupled to an external magnetic field due to flow in a conductor of an alternating current of predetermined magnitude and frequency, capacitive means associated with said winding to form therewith a circuit resonant at said frequency, a source of alternating reference current of said predetermined frequency coupled to said winding at said center tap, a pair of uni-directionally conductive devices connected series aiding between the ends of said winding, a connection from the junction of said pair of uni-directional devices to said source, direct-current output circuit means including alternating-current filter means connected to said center tap, and circuit means for connecting signal responsive means between said center tap and said junction whereby to impress uni-directional signal fluctuations on said signal responsive means.

6. Apparatus for detecting asymmetrical location of a sensing means with respect to an electromagnetic field established by an electric current of predetermined magnitude and frequency flowing in a conductor, which apparatus comprises a center tapped, balanced inductive winding, a source of alternating reference current of said frequency and means impressing said current on said winding at said center tap and on said conductor, a pair of unidirectionally conductive devices connected series aiding between the ends of said winding so that current flows alternately in each of the halves of the winding respectively during each half cycle, a return connection from the junction of said devices to said source, and connection means including alternating current filter means from said center tap and from said junction adapted to conduct rectified voltage fluctuations to signal-responsive means.

7. Sensing means adapted to detect its own asymmetrical location with respect to the center line of an elongated electromagnetic alternating current field of a predetermined frequency, which includes as a unitary structure movable with respect to said field, a balanced, bifilar-wound coil having a first common input and output terminal at the electrical midpoint of said coil, said coil being disposed so that one magnetic pole thereof is adapted to follow said center line capacitive means connected to said coil to form therewith a circuit resonant at said frequency, a series-aiding circuit including a pair of diode rectifiers, said bi-filar coil and a common junction between said diodes, said junction comprising a second common terminal comprising a return circuit terminal for both alternating and rectified currents, means for connecting a source of alternating voltage of said frequency between said terminals, and a signal utilization connection from said first common terminal adapted to conduct substantially only rectified voltage fluctuations to signal-responsive means.

8. In line-following means adapted to detect its own asymmetrical location with respect to an electromagnetic field produced by flow through a conducting line of current of a predetermined frequency, a unitary structure movable with respect to said line, including a balanced, cylindrical, bi-filar-wound coil having a first common alternating-current input and uni-directional current output terminal at the electrical midpoint of said coil, a magnetic core within said coil, said coil and core being disposed in said structure so that one end of the core is adapted to follow closely the center of said line, capacitive means associated with said coil to form therewith a circuit resonant at said frequency, a pair of diode rectifiers connected in a series-aiding circuit including said bi-filar coil, said rectifiers being disposed in said structure close to said coil so that the uni-directional output potential is developed within said movable structure, a common junction between said diodes, a return circuit terminal at said junction comprising a second common terminal for said alternating and unidirectional currents, means for connecting a source of alternating voltage of said frequency to said common terminals, a third terminal adapted for connection to uni-directional-signal responsive means, and circuit means adapted to conduct substantially only unidirectional current from said first terminal to said third terminal.

9. Sensing means adapted to detect its own asymmetrical location with respect to an electromagnetic field of predetermined radio frequency surrounding a narrow current-conducting line, which sensing means comprises as circuit components a single uniformly wound bi-filar inductance coil having a first common input and output terminal at the electrical midpoint of said coil, a cylindrical magnetic core within said coil, said core having an end of small diameter adapted to follow the center of said line capacitance associated with said coil to form therewith a circuit resonant at said radio frequency, a pair of diode rectifiers connected in a series-aiding circuit which includes said coil and a common junction between the diodes, a return circuit terminal connected to said junction, said return circuit terminal comprising a second common terminal for alternating and unidirectional currents, means for connecting a source of radio-frequency voltage of said frequency to said common terminals, a third terminal adapted for connection to unidirectional-signal responsive means, circuit means adapted to conduct substantially only unidirectional current from said first terminal to said third terminal, and means supporting the components which comprise said series-aiding circuit as a compact unitary rigid structure in which said small end of said core is disposed adjacent an exterior surface of the structure so as to be adapted to follow closely the center of said line.

10. Sensing means adapted to detect its own asymmetrical location with respect to an electromagnetic field established by an alternating current of predetermined frequency flowing in a linear conductor external to said sensing means, said sensing means comprising as a unitary structure: an inductance coil wound so as to establish two magnetic poles of opposite polarity at its respective ends, one only of said poles being disposed in said structure so as to be adapted to follow a linear conductor closely, a first terminal connected to the electrical midpoint of said coil, a pair of like unidirectionally conductive devices connected across the ends of said coil and to each other to form a series-aiding direct-current circuit, a common return terminal for both alternating and unidirectional currents connected to the junction of said devices, means for connecting a source of alternating current of said frequency to said terminals so that current flows between said midpoint and a different one of the ends of said coil during alternate half cycles, an output terminal for unidirectional current, and circuit means including alternating-current attenuating means connecting said first terminal to said output terminal whereby said output and common terminals are adapted to connect signal responsive means to said series-aiding circuit.

11. Sensing means adapted to detect its own asymmetrical location with respect to an electromagnetic field established by a high-frequency alternating current flowing in a linear conductor external to said sensing means, said sensing means comprising as a unitary structure: an inductance coil wound to be considerably longer than its diameter so as to establish two magnetic poles of opposite polarity at its respective ends, one only of said poles being disposed at a surface of said structure, said surface being adapted to be maintained adjacent said conductor when said structure and said conductor are in relative motion, a terminal connected to the electrical midpoint of said coil, a pair of like unidirectionally conductive devices connected across the ends of said coil and to each other to form a series-aiding direct-current circuit, a return terminal at the junction of said devices, means for connecting a source of alternating current of said high frequency to said terminals so that current flows between said midpoint and a different one of the ends of said coil during alternate half cycles, and circuit means adapted to connect direct-current signal responsive means to said series-aiding circuit, said circuit means including filter means operable to discriminate against said frequency.

12. In sensing means adapted to detect its own asymmetrical location with respect to an electromagnetic field established by a high-frequency alternating current flowing in a linear conductor external to said sensing means, a unitary structure including an inductance coil wound and connected so as to establish two magnetic poles of respective polarity at opposite ends thereof, a pair of like unidirectionally conductive devices having one set of electrodes of opposite polarity connected together at a junction terminal and having another pair of electrodes of opposite polarity connected to the respective ends of said coil to form a symmetrical series-aiding direct-current circuit, means for coupling an energizing current of said frequency symmetrically to said coil so that the instantaneous polarity of each of said poles is respectively the same for both half cycles of the energizing current, and terminal means connected to said coil and to said junction adapted to connect direct-current signal-responsive means to said series circuit.

13. Sensing means adapted to detect its own asymetrical location with respect to the center line of an elongated magnetic field established by an alternating current flowing in a linear conductor, said sensing means including an inductance coil having a magnetic pole adapted to be positioned so as to follow said center line, a series-aiding direct-current circuit comprising a pair of rectifiers connected to each other and to the ends of said coil, means for energizing said conductor with alternating current whereby to induce a voltage in said coil, means for energizing said coil with an alternating reference voltage coupled to the midpoint thereof, means including alternating current attenuating means for connecting a direct-current responsive device to said series-aiding circuit, and means for adjusting the magnitude of the reference voltage to balance the induced voltage when said pole is disposed symmetrically with respect to said line and whereby when said pole deviates from said line a signal voltage is produced in said coil which comprises the difference between said induced voltage and said reference voltage.

14. Sensing means adapted to detect its own asymmetrical location with respect to an electromagnetic field established by an alternating current of predetermined frequency flowing in a linear conductor external to said sensing means, said sensing means including a pair of similar inductive windings wound in the same direction on a continuous core, a common input and output terminal at the electrical mid-point of said windings, a pair of unidirectionally conductive devices connected series aiding between the ends of said windings opposite said terminal, a second common input and output terminal at the junction of said devices, said second common terminal being connected to a common return circuit, a unidirectional output terminal at which an output signal is available with respect to said common return circuit, circuit means adapted to conduct substantially only unidirectional current from said second common terminal to said unidirectional output terminal, and means for connecting a source of alternating voltage of said frequency between said common terminals so that current flows in each of said windings alternately during each successive half cycle, said core being so disposed that one end thereof is adapted to be maintained adjacent said conductor when said core and conductor are in relative motion.

References Cited in the file of this patent

UNITED STATES PATENTS

| | | |
|---|---|---|
| 1,689,292 | O'Neill | Oct. 30, 1928 |
| 2,339,291 | Paulus et al. | Jan. 18, 1944 |
| 2,374,166 | Beach et al. | Apr. 24, 1945 |
| 2,679,620 | Berry | May 25, 1954 |
| 2,758,276 | Foerster | Aug. 7, 1956 |
| 2,779,916 | Poole | Jan. 29, 1957 |

---

UNITED STATES PATENT OFFICE

CERTIFICATE OF CORRECTION

Patent No. 2,929,019            March 15, 1960

Joseph F. Bryan et al.

It is hereby certified that error appears in the printed specification of the above numbered patent requiring correction and that the said Letters Patent should read as corrected below.

Column 8, line 34, for "respective" read -- opposite --; same line, for "opposite" read -- respective --.

Signed and sealed this 23rd day of August 1960.

(SEAL)
Attest:

KARL H. AXLINE
Attesting Officer

ROBERT C. WATSON
Commissioner of Patents